United States Patent
Grinshpun et al.

(10) Patent No.: US 8,959,053 B2
(45) Date of Patent: Feb. 17, 2015

(54) CONFIGURATION FILE FRAMEWORK TO SUPPORT HIGH AVAILABILITY SCHEMA BASED UPON ASYNCHRONOUS CHECKPOINTING

(75) Inventors: Ed Grinshpun, Freehold, NJ (US); Bruce Cilli, Atlantic Highlands, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 1747 days.

(21) Appl. No.: 12/191,091

(22) Filed: Aug. 13, 2008

(65) Prior Publication Data

US 2010/0042639 A1  Feb. 18, 2010

(51) Int. Cl.
  *G06F 7/00* (2006.01)
  *G06F 17/30* (2006.01)
  *H04L 12/24* (2006.01)

(52) U.S. Cl.
  CPC ........ *H04L 41/0846* (2013.01); *H04L 41/0803* (2013.01)
  USPC ............................ 707/634; 707/659; 707/694

(58) Field of Classification Search
  None
  See application file for complete search history.

(56) References Cited

U.S. PATENT DOCUMENTS

| | | | | |
|---|---|---|---|---|
| 5,193,701 A * | 3/1993 | Bush et al. | | 220/4.33 |
| 5,535,406 A * | 7/1996 | Kolchinsky | | 712/10 |
| 5,536,406 A * | 7/1996 | Silva | | 210/460 |
| 5,628,010 A * | 5/1997 | Ooishi et al. | | 1/1 |
| 5,758,154 A * | 5/1998 | Qureshi | | 713/1 |
| 5,996,896 A * | 12/1999 | Grabon | | 235/472.02 |
| 6,748,116 B1 * | 6/2004 | Yue | | 382/238 |
| 7,137,126 B1 * | 11/2006 | Coffman et al. | | 719/328 |
| 2006/0236224 A1 * | 10/2006 | Kuznetsov et al. | | 715/513 |
| 2007/0112714 A1 * | 5/2007 | Fairweather | | 706/46 |
| 2007/0143407 A1 * | 6/2007 | Avritch et al. | | 709/206 |
| 2007/0150496 A1 * | 6/2007 | Feinsmith | | 707/100 |
| 2007/0260594 A1 * | 11/2007 | Lewak et al. | | 707/4 |
| 2008/0046457 A1 * | 2/2008 | Haub et al. | | 707/102 |
| 2009/0307086 A1 * | 12/2009 | Adams et al. | | 705/14.49 |

* cited by examiner

*Primary Examiner* — Daniel Kuddus
(74) *Attorney, Agent, or Firm* — Kramer & Amado, P.C.

(57) ABSTRACT

In various exemplary embodiments, a method and related system for configuration file management in a network element comprise one or more of the following: upon initialization of the network element, reading a first configuration file that is in a character-encoded format; for each application process, translating the first configuration file into a plurality of non-character-encoded configuration files; configuring each application process based on the respective plurality of non-character-encoded configuration files; modifying, in real-time, at least one of the non-character-encoded configuration files; and merging each of the non-character-encoded configuration files into a second configuration file that is in a character-encoded format.

19 Claims, 4 Drawing Sheets

CONFIGURATION FILE FRAMEWORK TO SUPPORT HIGH AVAILABILITY SCHEMA BASED UPON ASYNCHRONOUS CHECKPOINTING

BACKGROUND OF THE INVENTION

1. Field of the Invention

This invention relates generally to hybrid ASCII-binary configuration file management for asynchronous checkpointing and auditing of embedded system software.

2. Description of Related Art

Telecommunication service providers often advertise the reliability of their services by listing the percentage of time per year that their equipment provides full service. When calculating system downtime, service providers may include hardware outage, software failure, and software upgrade periods. For high availability (HA) systems, system downtime must be very infrequent.

Currently, there are two common categories of HA systems: some have "5-nines" availability, while others possess "6-nines" availability. A 5-nines system must be available 99.999% of the time, which translates to roughly five minutes of system downtime per year. A 6-nines system must be available 99.9999% of the time or about thirty seconds per year.

To ensure that HA systems meet their guaranteed availability, redundancy schemes are frequently used to provide protection from both hardware and software failures. In a 1+1 redundancy scheme, one piece of redundant equipment is provided for each active piece of equipment. Alternatively, to allow for cost savings, a service provider may utilize one redundant device for each set of N active devices.

In addition to the redundant hardware, HA systems must also include software that manages the dynamic software object state data transition to a redundant piece of hardware upon failure of the active hardware. Redundant hardware without corresponding software support may produce a "cold start" when initiating the backup hardware. When such a start occurs, services will be interrupted and all service-related, dynamic-persistent state data may be lost.

Even worse, substantial service restoration time may elapse before the redundant hardware becomes active. Service restoration time may include periods to reboot a system with a saved configuration, reestablish connections to network peers, and reestablish active services. Depending upon configuration, it may take several minutes to restore services after a cold start. Due to such outage periods, a system with a cold start can never achieve better than 4-nines availability.

In contrast, a system that requires 6-nines availability must meet very stringent software requirements. The system must have a downtime of less than 50 ms for application restarts, "warm start" of software applications, and controlled failover from an active mode to a standby mode. In addition, the system must take no longer than 5 seconds for software upgrades and uncontrolled failovers.

In addition to these time-based requirements, software packages for HA systems must meet a number of additional requirements. First, the software must maintain high application performance, as telecommunications devices often service thousands of calls per second and tens of thousands of routes or MPLS tunnels per second. Second, the software must checkpoint application state data, while maintaining consistency across multiple applications and between the control and data planes. Embedded systems will not function properly without maintaining data consistency across multiple application processes. Third, the software must allow addition of HA features to third party and legacy software that was not designed for HA systems.

In current systems, software support for hardware redundancy is accomplished using multiple Cooperating Application Processes (CAPs), with each CAP implementing a functional component. These components may include network protocols, hardware forwarding plane management, and dynamic object state information. The functional components exchange data through inter-process communication (IPC), such that the individual components form a cohesive whole. In addition, a standby control plane CAP operates in parallel for each CAP, thereby allowing a quick changeover upon hardware failure.

Asynchronous checkpointing is used to ensure data consistency among the CAPs. The checkpointing process ensures data consistency between active and standby control plane CAPs, across active CAPs, and between the control plane and data plane. In addition, asynchronous checkpointing allows system consistency validation on failover. In this checkpointing schema, each CAP checkpoints only a subset of the object data record, including configuration files, which contain instructions used to manage functionality of the network element.

In current schemes, configuration files are in either ASCII format or binary format, not a combination of the two. This results in significant inefficiencies, as ASCII-based systems require real-time conversion, which consumes resources and slows processing. In addition, ASCII-based files can consume a significant amount of storage space. On the other hand, binary-based schemes improve performance, but make it more difficult for the network operator to modify configuration files.

Accordingly, there is a need for a configuration file framework that minimizes the use of CPU-intensive file parsing and command line conversion logic. In addition, there is a need for a configuration file framework that allows for incremental replication of per-object checkpointed configuration data and automated per-object audits. Furthermore, there is a need to provide these performance benefits, while still allowing easy user editing of the configuration file.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for improved checkpointing, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments of a configuration file management method are based on the observation that character-encoded files, such as ASCII files, are only required for offline processing, not during system runtime. Furthermore, non-character-encoded configuration data files (e.g. pure binary files) are more performance efficient for incremental per-record updates. Thus, various exemplary embodiments provide a hybrid ASCII-binary configuration file management function to obtain the benefits of each method, while eliminating the corresponding disadvantages.

More specifically, in various exemplary embodiments, a character-encoded configuration file is maintained in non-volatile memory for convenient offline processing. Upon system initialization, a configuration file management function translates the configuration file into a set of objects on a per object-type basis. Then, run-time configuration read/write operations including checkpointing and auditing are performed on the non-character encoded files maintained by each cooperating application process. Thus, in various exemplary embodiments, no additional file locking is required, since only one CAP performs an operation on a given configuration file.

In various exemplary embodiments, the running configuration may then be saved into a character-encoded configuration file to allow a user to view and edit the modified configuration. Thus, a Module Manager may asynchronously request via IPC that all CAPs save the running configuration into corresponding non-character-encoded configuration files. This may be, for example, a temporary copy of the running configuration binary file. Then, once all CAPs report completion of the operation, the Module Manager may invoke the Configuration File function to re-assemble the non-character-encoded configuration files into character-encoded format. This latter operation may be performed in the background without blocking CAPs, such that the CAPs may continue processing real-time asynchronous events.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
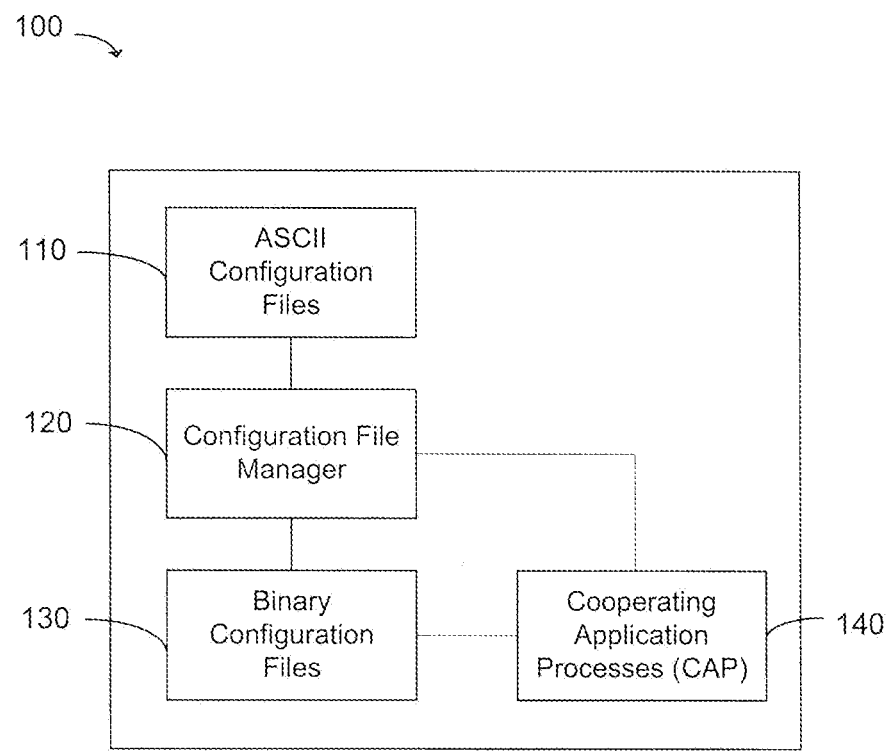
FIG. 1 shows an exemplary network element configured to implement a configuration file framework used to support a high availability schema.

Referring now to the drawings, in which like numerals refer to like components or steps, there are disclosed broad aspects of various exemplary embodiments.

FIG. 1 shows an exemplary network element 100 configured to implement a configuration file framework used to support a high availability schema. In various exemplary embodiments, network element 100 is a line card, router, switch, or any other device used by a service provider to offer telecommunications functionality. It should be apparent that, in various exemplary embodiments, network element 100 is in communication with a local server (not shown), from which the network element 100 receives configuration data provided by an operator. Furthermore, it should be apparent that network element 100 includes one or more processors configured to execute the methods and processes described herein.

In various exemplary embodiments, network element 100 stores one or more character-encoded configuration files 110 in computer-readable non-volatile memory, such as a flash memory drive or a hard-drive. These configuration files 110 may be updated via communication with a local server or may be modified directly by an operator located at network element 100.

In various exemplary embodiments, character-encoded configuration files 110 are stored in ASCII format. ASCII, shorthand for American Standard Code for Information Interchange, is a character encoding scheme based on the English alphabet. Thus, configuration files 110 may be edited by an operator using a text editor program. Although further described herein with reference to ASCII encoding, configuration files 110 may in any character-encoded format, including, but not limited to, ISO/IEC 646 and Unicode.

In various exemplary embodiments, network element 100 includes a configuration file manager 120, which has access to character-encoded configuration files 110 and non-character-encoded configuration files 130. Configuration file manager 120 may be a process executed by network element 100 to manage parsing, execution, editing, and retrieval of the configuration files 110, 130. Furthermore, configuration file manager 120 may communicate with each of the plurality of cooperating application processes 140 via IPC requests or some other internal communication mechanism. The functionality implemented by configuration file manager 120 is described further below with reference to FIGS. 2-4.

In addition, network element 100 stores a plurality of non-character-encoded configuration files 130 in a computer-readable memory, such as dynamic random access memory. In various exemplary embodiments, configuration file manager 120 reads the one or more character-encoded configuration files 110 and generates the non-character encoded configuration files 130 through a parsing and conversion process. In various exemplary embodiments, non-character-encoded configuration files 130 are raw binary files including a plurality of "1"s and "0"s, with no corresponding character encoding.

Non-character-encoded configuration files 130 are therefore suitable for rapid execution and modification by cooperating application processes 140, as the processes need not execute a parsing and conversion process prior to reading binary files. Although further described herein as binary files, configuration files 130 may be stored in any machine-readable format that does not contain an underlying character encoding scheme, including, but not limited to decimal and hexadecimal formats.

Network element 100 may also include a plurality of cooperating application processes 140 configured to implement the functionality of network element 100. Thus, in various exemplary embodiments, each CAP 140 implements a portion of the functionality of network element 100. For example, a first CAP may implement networking protocols, including, but not limited to, Mobile Internet Protocol (MIP), Layer 2 bridging, Multi-Protocol Label Switching, call processing, and mobility management. A second CAP may implement hardware forwarding plane management by configuring interfaces, link states, switch fabrics, and flow set-ups. A third CAP may implement Operations, Administration, and Maintenance functions. It should be apparent, however, that any number of CAPs may be used to implement functionality required by network element 100.

As CAPs 140 execute the required functionality, each CAP 140 performs read/write operations on non-character encoded configuration file 130 corresponding to the process. These read/write operations include incremental checkpointing and audits.

Figure 2:
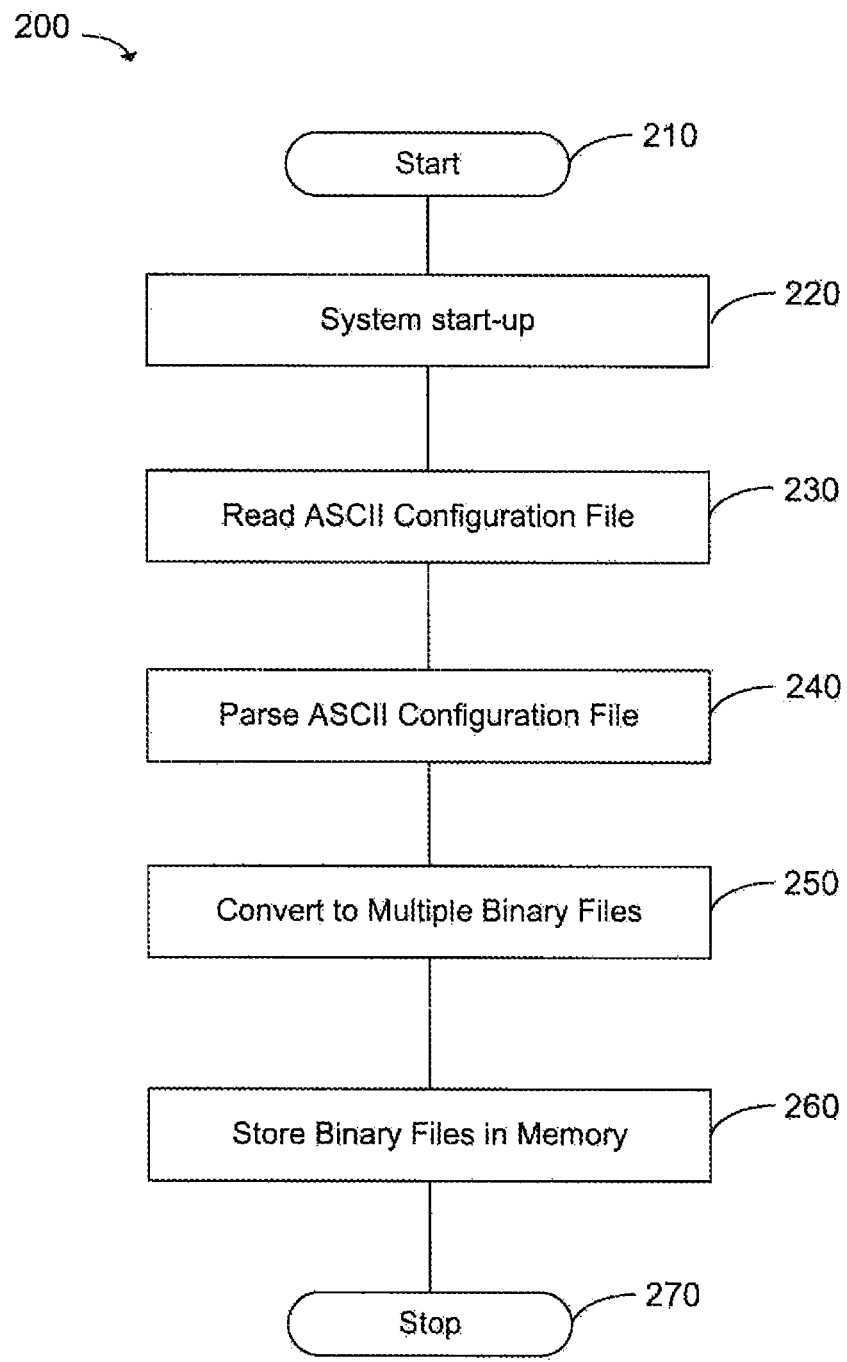
FIG. 2 is a flowchart of an exemplary method performed upon start-up of a network element.

FIG. 2 is a flowchart of an exemplary method 200 performed upon start-up of exemplary network element 100. Exemplary method 200 starts in step 210 and proceeds to step 220, where the network element 100 receives a system initialization indication. It should be apparent that this initialization signal may be received from a number of different sources, including a Module Manager (MoM), which is used to control a plurality of network elements.

After receiving a start-up signal in step 220, exemplary method 200 proceeds to step 230, where each CAP 140 reads the ASCII configuration file 110 through communication with the configuration file manager 120. Thus, in various exemplary embodiments, each CAP 140 retrieves the ASCII configuration file 110 from non-volatile memory, such as a hard-drive or flash memory drive.

Exemplary method 200 then proceeds to step 240, where each CAP 140 parses the ASCII configuration file 110. Thus, each CAP 140 may process the ASCII configuration file 110 to identify portions of the file relevant to operation of the functionality managed by the CAP 140. Exemplary method 200 then proceeds to step 250, where each CAP 140 translates the ASCII configuration file 110 to a corresponding set of raw binary configuration files 130 based on the object type. It should be apparent that this conversion process may be executed using any ASCII-to-binary conversion method known in the art.

Finally, after reading, parsing, and converting the binary files in steps 230, 240, and 250, exemplary method 200 proceeds to step 260. In step 260, each CAP 140 stores the corresponding binary configuration files 130 in memory, such as dynamic random access memory (DRAM). Exemplary method 200 then proceeds to step 270, where the network element initialization process 200 stops.

Figure 3:
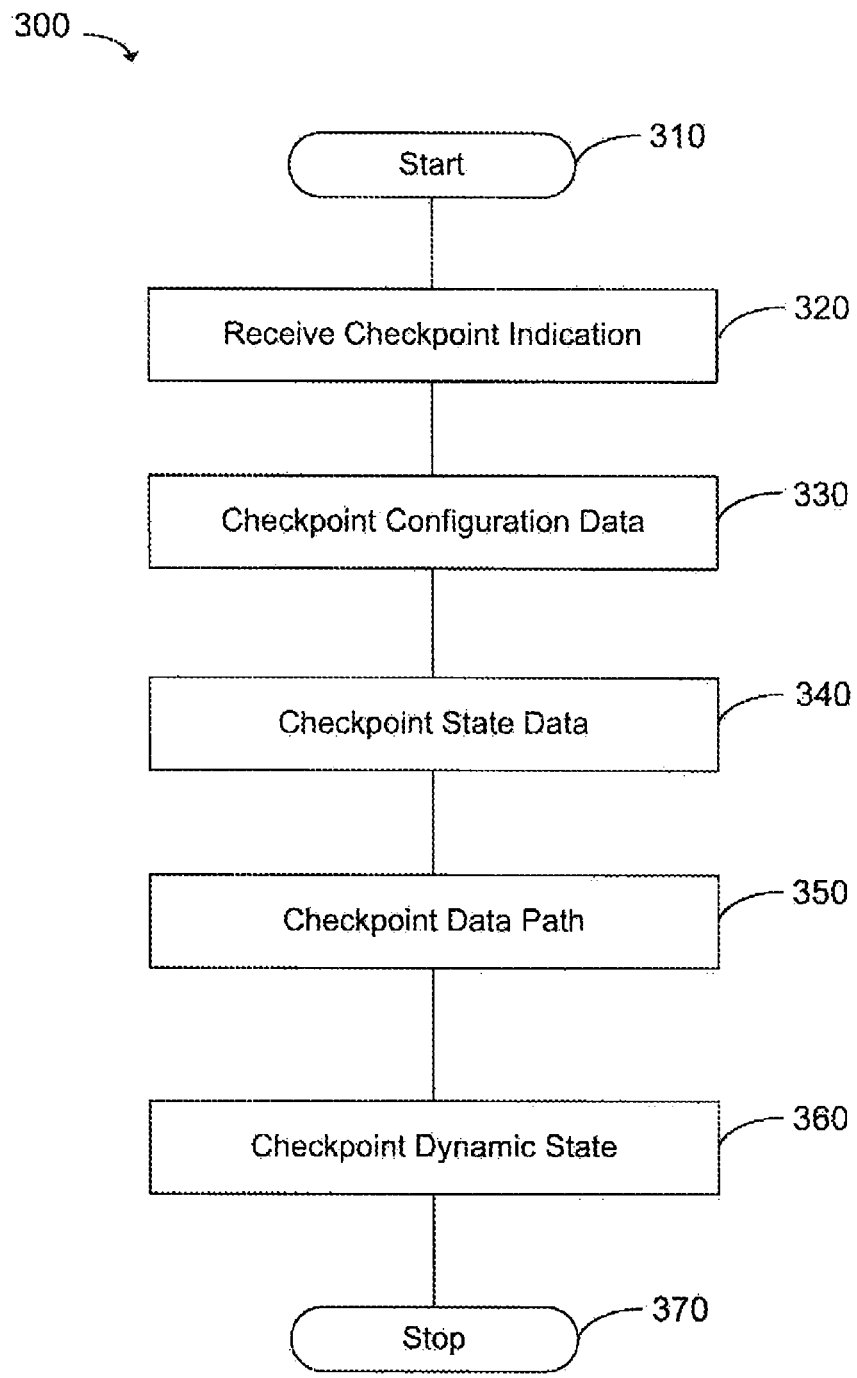
FIG. 3 is a flowchart of an exemplary method used to checkpoint data in a network element.

FIG. 3 is a flowchart of an exemplary method 300 used to checkpoint data in exemplary network element 100. Exemplary method 300 starts in step 310 and proceeds to step 320, where network element 100 receives an indication that a checkpoint is required. This could occur, for example, when a network element receives an indication from Operations, Administration, and Maintenance (OA&M) to change its configuration.

Exemplary method 300 then proceeds to step 330, where network element 100 checkpoints configuration data. More specifically, in various exemplary embodiments, network element 100 copies all binary configuration files 130 onto a standby network element. State data are checkpointed in step 340. The data path is checkpointed in step 350. Finally, in step 360, the dynamic state is checkpointed. The process concludes in step 370.

Figure 4:
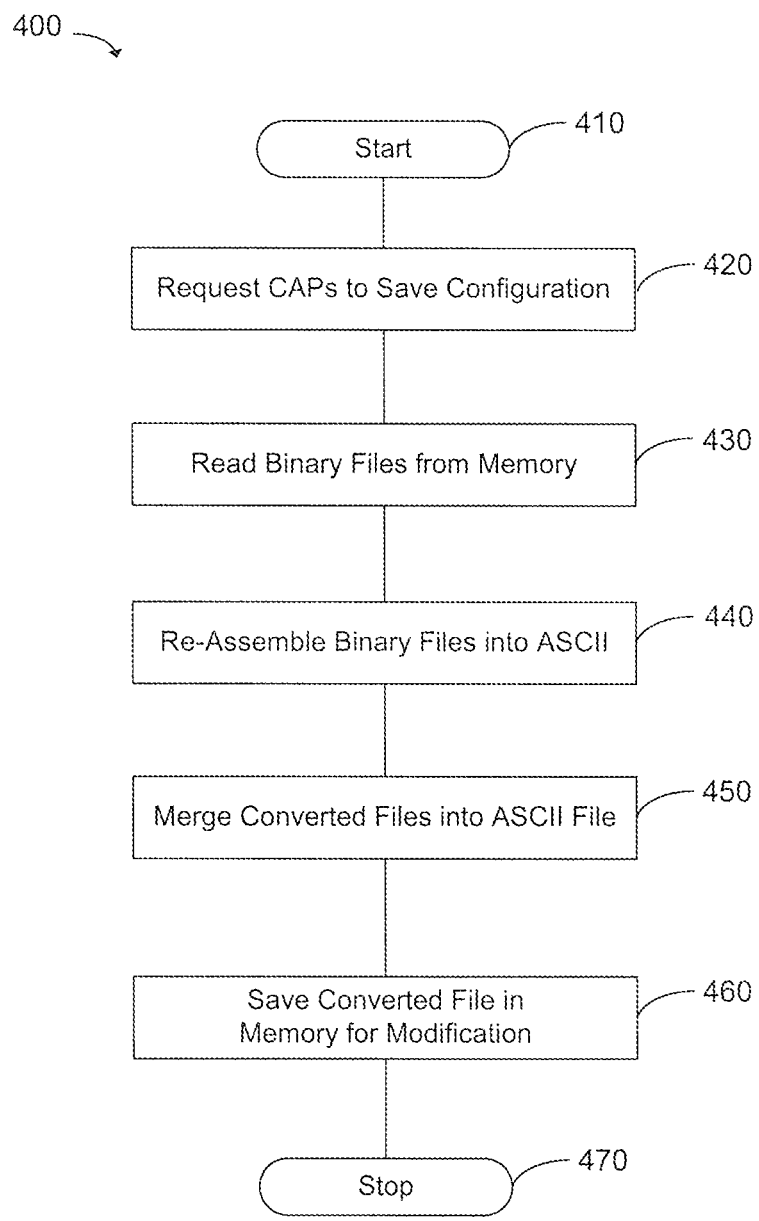
FIG. 4 is a flowchart of an exemplary method performed to convert multiple binary configuration files into a character encoded format.

FIG. 4 is a flowchart of an exemplary method 400 performed to convert multiple binary configuration files into a character-encoded format. In various exemplary embodiments, method 400 starts in step 410 when an operator indicates a desire to update the configuration files in use. After checkpointing the currently running files according to the method described above with reference to FIG. 3, network element 100 executes the following procedure to provide a character-encoded version of the configuration files to the network operator.

Thus, in step 420, configuration file manager 120 requests that each CAP 140 save its current configuration data to a set of temporary binary configuration files. For example, configuration file manager 120 may asynchronously request that each CAP 140 save its running configuration file into a temporary copy by sending an IPC request. Exemplary method 400 then proceeds to step 430, where each CAP 140, upon receiving the request, reads the binary configuration files 130 from memory and writes the temporary copy. After writing of the copy, each CAP 140 reports completion of the operation via an additional message.

Once all CAPs 140 report completion of the operation, exemplary method 400 proceeds to step 440, where configuration file manager 140 invokes a function to reassemble the binary configuration files into a character-encoded format. It should be apparent that this operation may be performed using any binary to ASCII conversion method known to those of skill in the art. In various exemplary embodiments, this operation is performed in the background, such that CAPs 140 are not blocked and continue to process asynchronous events in real-time. In step 450, the re-assembled binary files are merged into a single ASCII file.

Exemplary method 400 then proceeds to step 460, where the system saves the character-encoded file in memory. In various exemplary embodiments, this file is saved in non-volatile memory on network element 100 and directly edited by an operator. Alternatively, in various exemplary embodiments, the file is transferred to a local server or other system for user editing. Finally, exemplary method 400 proceeds to step 470, where exemplary method 400 stops.

According to the forgoing, a hybrid method for updating configuration files combines the benefits of character-encoded and raw binary configuration files. More particularly, a human readable format, such as ASCII, is used to store configuration files, such that a user can easily modify the configuration settings. However, binary files are accessed by the network element in real-time, such that each configuration update may be quickly applied by the application process to the binary configuration file. This process eliminates the necessity of parsing and processing a character-encoded file, while eliminating serialization in configuration file updates. Furthermore, because binary files stored in RAM are primarily used, write operations to configuration files stored in flash memory are minimized, thereby prolonging the life of the flash memory device.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for configuration file management in a network element that executes a plurality of application processes, the method comprising:
   upon initialization of the network element, reading a first configuration file that is in a character-encoded format from a non-volatile memory device;
   for each application process, translating the first configuration file into a plurality of non-character-encoded configuration files;
   storing the plurality of non-character-encoded configuration files in a dynamic random access memory;

configuring each application process based on the respective plurality of non-character-encoded configuration files;

modifying, in real-time, at least one of the non-character-encoded configuration files; and merging each of the non-character-encoded configuration files into a second configuration file that is in a character-encoded format.

2. The method for configuration file management in the network element according to claim 1, wherein the character-encoded format is an American Standard Code for Information Interchange (ASCII) format.

3. The method for configuration file management in the network element according to claim 1, wherein the non-character-encoded format is a binary format.

4. The method for configuration file management in the network element according to claim 1, further comprising:
storing the first configuration file in a non-volatile memory in the network element.

5. The method for configuration file management in the network element according to claim 4. wherein the non-volatile memory is a flash memory device.

6. The method for configuration file management in the network element according to claim 1, wherein the step of translating the first configuration file into a plurality of non-character-encoded configuration files is done per object type.

7. The method for configuration file management in the network element according to claim 1, further comprising:
requesting, via inter-process communication, that each application process create a temporary copy of the respective non-character-encoded configuration files.

8. The method for configuration file management in the network element according to claim 1, further comprising:
forwarding the second configuration file to a network operator for editing.

9. The method for configuration file management in the network element according to claim 1, wherein the step of merging occurs at substantially a same time as the execution of the plurality of application processes.

10. A network element for configuration file management in a high-availability, embedded system, the network element comprising:

a non-volatile memory device storing a first configuration file in a character-encoded format;

a dynamic random access memory; and a processor configured to execute a plurality of application processes, read the first configuration file upon receiving an initialization signal, for each application process, translate the first configuration file into a plurality of non-character-encoded configuration files, store the plurality of non-character-encoded configuration files on the dynamic random access memory, configure each application process based on the respective plurality of non-character-encoded configuration files, modify, in real-time, at least one of the non-character-encoded configuration files, and merge each of the non-character-encoded configuration files into a second configuration file that is in a character-encoded format.

11. The network element according to claim 10, wherein the character-encoded format is an American Standard Code for Information Interchange (ASCII) format.

12. The network element according to claim 10, wherein the non-character-encoded format is a binary format.

13. The network element according to claim 10, wherein the non-volatile memory device is a flash memory device.

14. The network element according to claim 10, wherein the processor translates the first configuration file into a plurality of non-character-encoded configuration files per object type.

15. The network element according to claim 10, wherein the processor is further configured to request, via inter-process communication, that each application process create a temporary copy of the respective non-character-encoded configuration files.

16. The network element according to claim 10, wherein the processor is further configured to forward the second configuration file to a network operator for editing.

17. The network element according to claim 10, wherein the non-character-encoded format is a decimal format.

18. The network element according to claim 10, wherein the non-character-encoded format is a hexadecimal format.

19. The network element according to claim 10, wherein the non-volatile memory device is a hard drive.

* * * * *